(12) United States Patent
Lin (10) Patent No.: US 11,176,354 B2
(45) Date of Patent: Nov. 16, 2021

(54) CONTROL METHOD, ELECTRONIC DEVICE AND COMPUTER-READABLE STORAGE MEDIUM

(71) Applicant: GUANGDONG OPPO MOBILE TELECOMMUNICATIONS CORP., LTD., Guangdong (CN)

(72) Inventor: Shangbo Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 58 days.

(21) Appl. No.: 16/625,614

(22) PCT Filed: Jun. 11, 2018

(86) PCT No.: PCT/CN2018/090625
§ 371 (c)(1),
(2) Date: Dec. 20, 2019

(87) PCT Pub. No.: WO2019/007191
PCT Pub. Date: Jan. 10, 2019

(65) Prior Publication Data
US 2021/0142040 A1   May 13, 2021

(30) Foreign Application Priority Data

Jul. 7, 2017   (CN) .......................... 201710552517.5

(51) Int. Cl.
*G06K 9/00* (2006.01)
*G06F 21/32* (2013.01)
*G06K 9/20* (2006.01)

(52) U.S. Cl.
CPC ......... *G06K 9/00228* (2013.01); *G06F 21/32* (2013.01); *G06K 9/00604* (2013.01);
(Continued)

(58) Field of Classification Search
CPC ...................................................... G06F 21/32
See application file for complete search history.

(56) References Cited

U.S. PATENT DOCUMENTS

| 9,288,371 B2 | 3/2016 | Ganesh et al. |
| 10,049,272 B2 | 8/2018 | Agrawal et al. |

(Continued)

FOREIGN PATENT DOCUMENTS

| CN | 102548153 A | 7/2012 |
| CN | 104284472 A | 1/2015 |

(Continued)

OTHER PUBLICATIONS

International Search Report in the international application No. PCT/CN2018/090625, dated Sep. 25, 2018.
(Continued)

*Primary Examiner* — Edward Park
(74) *Attorney, Agent, or Firm* — Ladas & Parry, LLP (57) ABSTRACT

Disclosed is a control method for an infrared light source assembly (10). The method is used for an electronic device (100), wherein the electronic device (100) comprises a camera (20). The infrared light source assembly (10) comprises at least two infrared light sources (12) having different illumination ranges. The control method comprises: (S32) controlling the camera (20) so that same collects a face image; (S34) processing the face image to acquire face position information; and (S36) starting, according to the face position information, an infrared light source (12) having an illumination range corresponding to that into which a face falls, and turning off other infrared light sources (12) or keeping some turned off. Further disclosed are an electronic device (100) and a computer-readable storage medium (800).

18 Claims, 8 Drawing Sheets

(52) U.S. Cl.
CPC ........... *G06K 9/209* (2013.01); *G06K 9/2027* (2013.01); *G06K 9/2036* (2013.01)

(56) References Cited

U.S. PATENT DOCUMENTS

| | | | |
|---|---|---|---|
| 2009/0294666 A1* | 12/2009 | Hargel | G01J 5/0014 250/330 |
| 2014/0160307 A1 | 6/2014 | Ganesh et al. | |
| 2015/0029165 A1* | 1/2015 | Thompson | G06F 3/0416 345/179 |
| 2015/0085097 A1 | 3/2015 | Larsen | |
| 2015/0160725 A1* | 6/2015 | Lee | A61B 3/113 348/78 |
| 2015/0332085 A1 | 11/2015 | Yu | |
| 2016/0283789 A1 | 9/2016 | Slaby et al. | |
| 2016/0350607 A1 | 12/2016 | Sokeila et al. | |
| 2017/0091543 A1 | 3/2017 | Mudit | |
| 2018/0013960 A1 | 1/2018 | Larsen | |
| 2019/0122061 A1* | 4/2019 | Li | G06K 9/00892 |
| 2019/0261491 A1* | 8/2019 | Abalos | G08B 13/19626 |
| 2019/0364228 A1 | 11/2019 | Larsen | |

FOREIGN PATENT DOCUMENTS

| | | |
|---|---|---|
| CN | 104854857 A | 8/2015 |
| CN | 106068048 A | 11/2016 |
| CN | 106295471 A | 1/2017 |
| CN | 205899558 U | 1/2017 |
| CN | 106874895 A | 6/2017 |
| CN | 107463880 A | 12/2017 |
| WO | 2016191398 A1 | 12/2016 |
| WO | 2017052807 A1 | 3/2017 |

OTHER PUBLICATIONS

First Ofice Action of the Chinese application No. 201710552517.5, dated Aug. 28, 2019.
Notice of Rejection of the Chinese application No. 201710552517.5, dated Apr. 3, 2020.
Supplementary European Search Report in the European application No. 18827737.0, dated Jun. 18, 2020.
English translation of the Written Opinion of the International Search Authority in the international application No. PCT/CN2018/090625, dated Sep. 25, 2018.
Second Office Action of the Chinese application No. 201710552517.5, dated Dec. 12, 2019.
Office Action of the Indian application No. 201917049094, dated Mar. 22, 2021.

* cited by examiner

CONTROL METHOD, ELECTRONIC DEVICE AND COMPUTER-READABLE STORAGE MEDIUM

CROSS-REFERENCE TO RELATED APPLICATIONS

This application is a national phase of International Application No. PCT/CN2018/090625 filed on Jun. 11, 2018, which claims priority and benefit to Chinese Patent Application No. 201710552517.5 filed on Jul. 7, 2017. The disclosures of these applications are hereby incorporated by reference in their entirety.

TECHNICAL FIELD

The disclosure relates to electronic devices, and more particularly to a control method, an electronic device and a computer-readable storage medium.

BACKGROUND

Iris recognition generally requires an infrared light source to assist an infrared camera to acquire a clear iris image. However, an illumination range of the infrared light source is limited, which results in a limited working range for the iris recognition.

SUMMARY

The embodiments of the disclosure provide a control method, an electronic device and a computer-readable storage medium.

A control method for an infrared light source assembly according to the embodiments of the disclosure may be used in an electronic device. The electronic device may include a camera. The infrared light source assembly may include at least two infrared light sources having different illumination ranges. The control method may include the following operations.

The camera is controlled to acquire an image of a face.

The image of the face is processed to obtain position information of the face.

According to the position information of the face, an infrared light source, that has an illumination range into which the face falls, is turned on, and other infrared light sources are turned off or remain turned off.

An electronic device according to the embodiments of the disclosure may include an infrared light source assembly, a camera, and a processor.

The infrared light source assembly includes at least two infrared light sources having different illumination ranges.

The camera is configured to acquire an image of a face.

The processor is configured to turn on, according to position information of the face in the image of the face that is acquired by the camera, an infrared light source that has an illumination range into which the face falls, and turn off or keep turning off other infrared light sources.

An electronic device according to the embodiments of the disclosure may include an infrared light source assembly, a camera, one or more processors, a memory, and one or more programs.

The infrared light source assembly includes at least two infrared light sources having different illumination ranges.

The one or more programs are stored in the memory, and are configured to be executed by the one or more processors to perform the control method.

A computer-readable storage medium according to the embodiments of the disclosure may include a computer program for use in conjunction with an electronic device. The computer program may be executed by a processor to perform the control method.

In the control method, the electronic device and the computer-readable storage medium according to the embodiments of the disclosure, an infrared light source is turned on according to position information of a face, so that the face falls into an illumination range of the infrared light source which is turned on, thereby facilitating the electronic device to acquire a clear iris image.

Additional aspects and advantages of the disclosure will be set forth in part in the following description. Some will become apparent from the following description, or will be understood by the practice of the disclosure.

BRIEF DESCRIPTION OF DRAWINGS

The above and/or additional aspects and advantages of the disclosure will become apparent and readily understood from the description of the embodiments in conjunction with the accompanying drawings.

SYMBOL DESCRIPTION OF MAIN COMPONENTS

100: Electronic device, 10: Infrared light source assembly, 12: Infrared light source, 20: Camera, 22: Infrared camera, 24: Visible light camera; 30: Processor, 40: Iris recognition module, 50: Housing, 52: Front surface, 60: Memory, 800: Computer-readable storage medium.

DETAILED DESCRIPTION

The embodiments of the disclosure are described in detail below, and the implementations of the embodiments are illustrated in the drawings, where the same or similar reference numerals are used to refer to the same or similar elements or elements having the same or similar functions. The embodiments described below with reference to the drawings are only intended to be illustrative of the disclosure and are not to be construed as limiting the disclosure.

Figure 1:
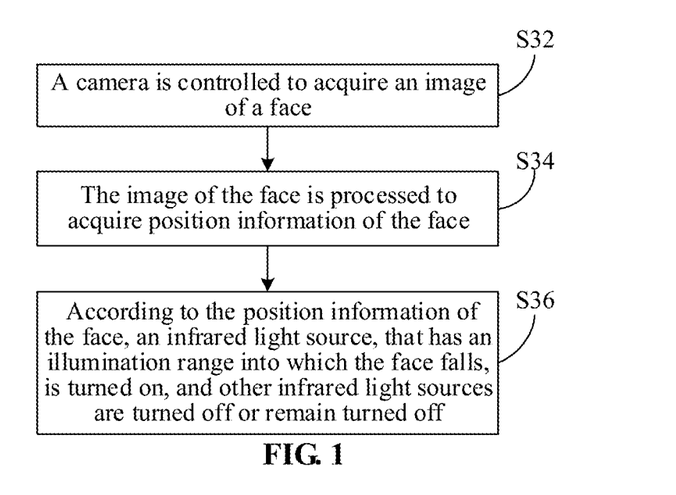
FIG. 1 is a flowchart of a control method for an infrared light source assembly according to the embodiments of the disclosure.
Figure 2:
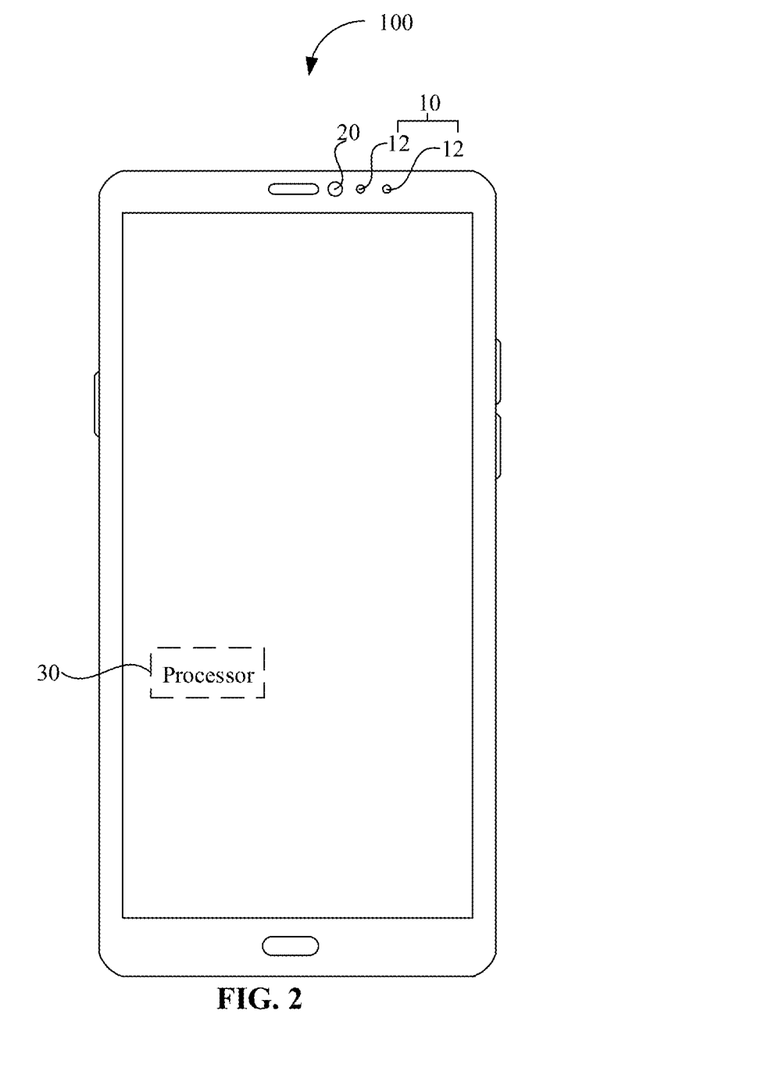
FIG. 2 is a plan view of an electronic device according to the embodiment of the disclosures.

Referring to FIG. 1 and FIG. 2, a control method for an infrared light source assembly 10 according to the embodiments of the disclosure may be used in an electronic device 100. The electronic device 100 includes a camera 20. The infrared light source assembly 10 includes at least two infrared light sources 12 having different illumination ranges. The control method includes the following operations.

At S32, the camera 20 is controlled to acquire an image of a face.

At S34, the image of the face is processed to obtain position information of the face.

At S36, according to the position information of the face, an infrared light source 12, that has an illumination range into which the face falls, is turned on, and other infrared light sources 12 are turned off or remain turned off.

Referring to FIG. 2 again, an electronic device 100 according to the embodiments of the disclosure includes an infrared light source assembly 10, a camera 20 and a processor 30. The infrared light source assembly 10 includes at least two infrared light sources 12 having different illumination ranges. The processor 30 is configured to: control the camera 20 to acquire an image of a face; process the image of the face to obtain position information of the face; and turn on, according to the position information of the face, an infrared light source 12 that has an illumination range into which the face falls, and turning off or keep turning off other infrared light sources 12.

That is, the control method according to the embodiments of the disclosure may be performed by the electronic device 100 according to the embodiments of the disclosure, where the operations S32, S34 and S36 may be performed by the processor 30.

In the control method and the electronic device 100 according to the embodiments of the disclosure, an infrared light source 12 is turned on according to position information of a face, so that the face falls into an illumination range of the infrared light source 12 which is turned on, thereby facilitating the electronic device 100 to acquire a clear iris image.

In some embodiments, each infrared light source 12 may be a light source capable of generating infrared radiation (infrared light), the infrared radiation is a range of electromagnetic radiation having a wavelength greater than a red light wavelength.

In some embodiments, the at least two infrared light sources 12 with different illumination ranges may be disposed at different positions, such as the upper, lower, left, and right parts of the electronic device 100. Due to the limitation of a respective illumination range of each infrared light source 12, the infrared light sources 12 can cover different illumination ranges. For example, when an infrared light source 12 is on the left side of the electronic device 100, the infrared light source 12 has a better illumination effect on the left front side of the electronic device 100, but has a poor illumination effect on the right front side of the electronic device 100 and even cannot cover.

In some embodiments, the position information of the face (i.e., the face position information) may be a position of the face relative to the electronic device 100. For example, when the face is in the left front of the electronic device 100, the face position information includes the left front, and thus the infrared light source 12 with the corresponding illumination range may be the infrared light source 12 on the left side of the electronic device 100, so that the infrared light source 12 on the left side of the electronic device 100 may be turned on to provide infrared light to the face. In addition, other infrared light sources 12 may be turned off or remain turned off to avoid unnecessary power consumption of the electronic device 100 and severe heat generation caused by the operation of the multiple infrared light sources 12 together. Since other infrared light sources 12 other than the infrared light source 12 with the corresponding illumination range may be in an on state or an off state, other infrared light sources 12 are turned off or remain turned off may include that the infrared light source(s) 12 in an on state among other infrared light sources 12 is/are turned off, and the infrared light source(s) 12 in an off state among other infrared light sources 12 remain(s) turned off.

In some embodiments, the face position information includes eye position information, nose position information, ear position information, or the like. That is, the face position information may be determined by position information of a part such as an eye, a nose, or an ear.

In some embodiments, the electronic device 100 includes a mobile phone, a notebook computer, a tablet computer, a smart watch, or smart glasses. In the embodiments of the disclosure, the electronic device 100 is a mobile phone.

Figure 3:
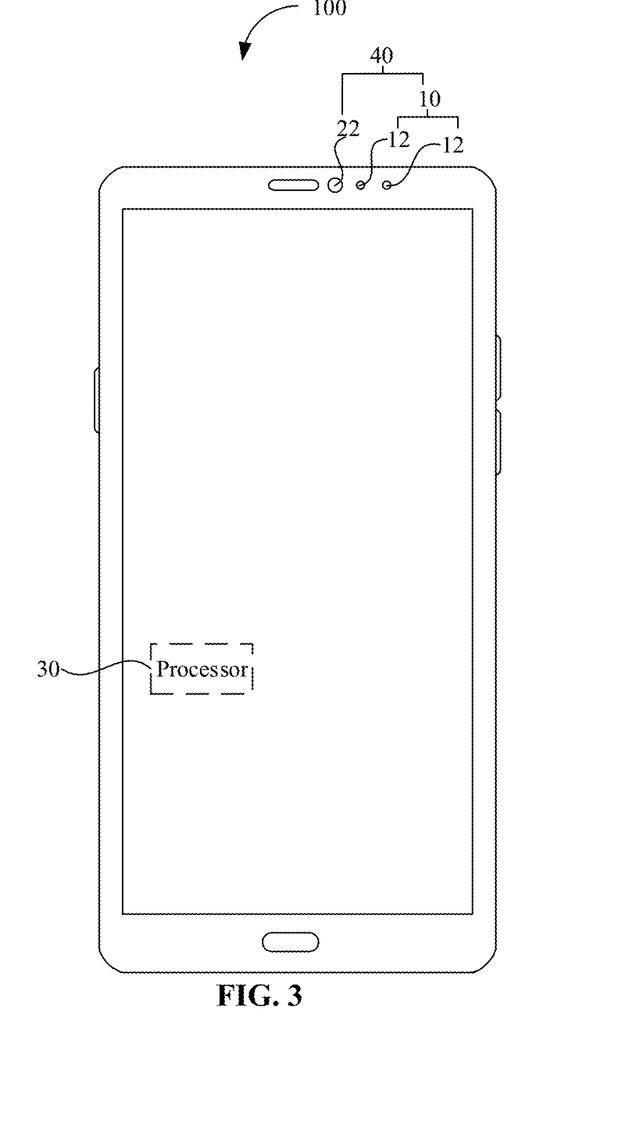
FIG. 3 is another plan view of an electronic device according to the embodiments of the disclosure.

Referring to FIG. 3, in some embodiments, the camera 20 includes an infrared camera 22. The electronic device 100 includes an iris recognition module 40. The iris recognition module 40 includes an infrared light source assembly 10 and the infrared camera 22.

As such, the infrared camera 22 and the infrared light source assembly 10 may cooperate to achieve imaging of an iris image.

An infrared light source 12 in the infrared light source assembly 10 is used to emit infrared light to the eye to make the details of the iris (such as spots, filaments, crowns, stripes, and crypts) become clear, and the infrared camera 22 is used to perform imaging of the iris to obtain an iris image.

Figure 4:
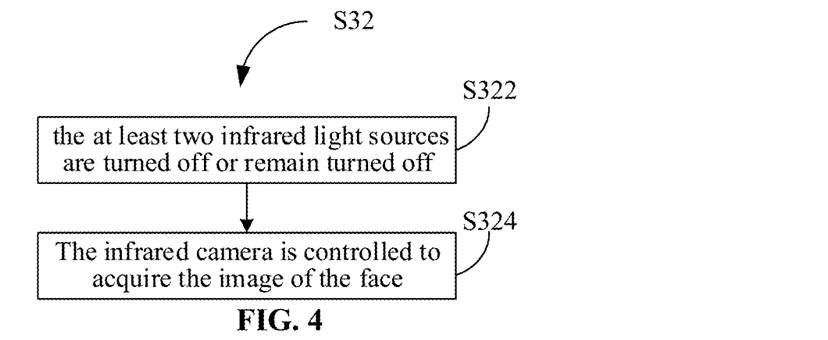
FIG. 4 is another flowchart of a control method for an infrared light source assembly according to the embodiments of the disclosure.

Referring to FIG. 4, in some embodiments, S32 includes the following operations.

At S322, the at least two infrared light sources 12 are turned off or remain turned off.

At S324, the infrared camera 22 is controlled to acquire the image of the face.

Referring to FIG. 3 again, in some embodiments, the processor 30 is configured to: turn off or keep turning off the at least two infrared light sources 12; and control the infrared camera 22 to acquire the image of the face.

That is, the operations S322 and S324 may be performed by the processor 30.

As such, the infrared camera 22 may be used to acquire the image of the face (i.e., the face image).

In the embodiments of the disclosure, the face image is used to obtain the face position information, and thus the requirement on the quality (such as color or resolution) of the face image is not high, so the infrared camera 22 may be used to acquire the face image. Thus, the face image acquired by the infrared camera 22 is used to obtain the face position information. In addition, when the infrared camera 22 acquires the face image, all the infrared light sources 12 may be turned off and remain turned off to avoid unnecessary power consumption of the electronic device 100.

Figure 5:
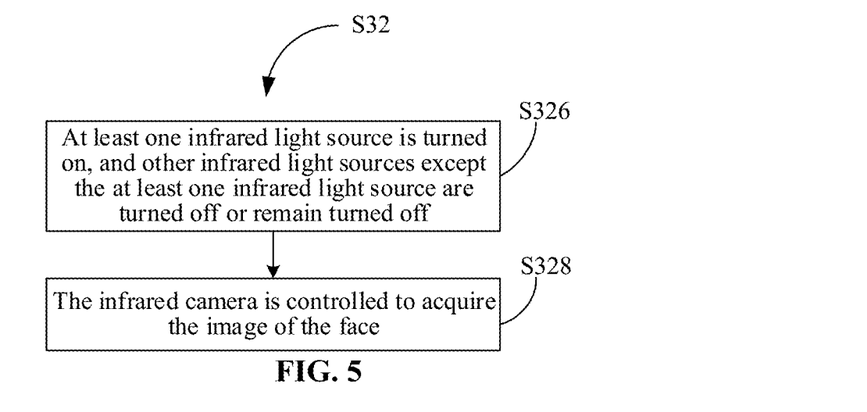
FIG. 5 is still another flowchart of a control method for an infrared light source assembly according to the embodiments of the disclosure.

Referring to FIG. 5, in some embodiments, S32 includes the following operations.

At S326, at least one infrared light source 12 is turned on, and other infrared light sources 12 except the at least one infrared light source 12 are turned off or remain turned off.

At S328, the infrared camera 22 is controlled to acquire the image of the face.

Referring to FIG. 3 again, in some embodiments, the processor 30 is configured to: turn on at least one infrared light source 12, and turn off or keep turning off other infrared light sources 12 except the at least one infrared light source 12; and control the infrared camera 22 to acquire the image of the face.

That is, the operations S326 and S328 may be performed by the processor 30.

As such, an infrared light source 12 may be turned on to assist the infrared camera 22 in acquiring the image of the face (i.e., the face image).

In some embodiments, for example, the infrared camera 22 has insufficient infrared light acquisition capability due to the relatively low configuration of the infrared camera 22, thereby causing the infrared camera 22 to not separately acquire the face image. Therefore, at least one infrared light source 12 may be turned on to assist the infrared camera 22 in acquiring the face image, and other infrared light sources 12 except the at least one infrared light source 12 are turned off or remain turned off to reduce power consumption of the electronic device 100. The at least one infrared light source 12 is turned on means that at least one of the at least two infrared light sources 12 is turned on. For example, any one of the at least two infrared light sources 12 may be turned on at first and the infrared camera 22 is controlled to acquire the face image, and it is determined whether the infrared camera 22 successfully acquires the face image. If the face image is successfully acquired, the subsequent control method may be performed, for example, S34: the image of the face is processed to obtain the position information of the face. If the face image is unsuccessfully acquired, one more infrared light source 12 may be turned on, or the infrared light source 12 that is currently turned on may be turned off and another infrared light source 12 may be turned on; and the infrared camera 22 is controlled to acquire a face image until the face image is successfully acquired.

Figure 6:
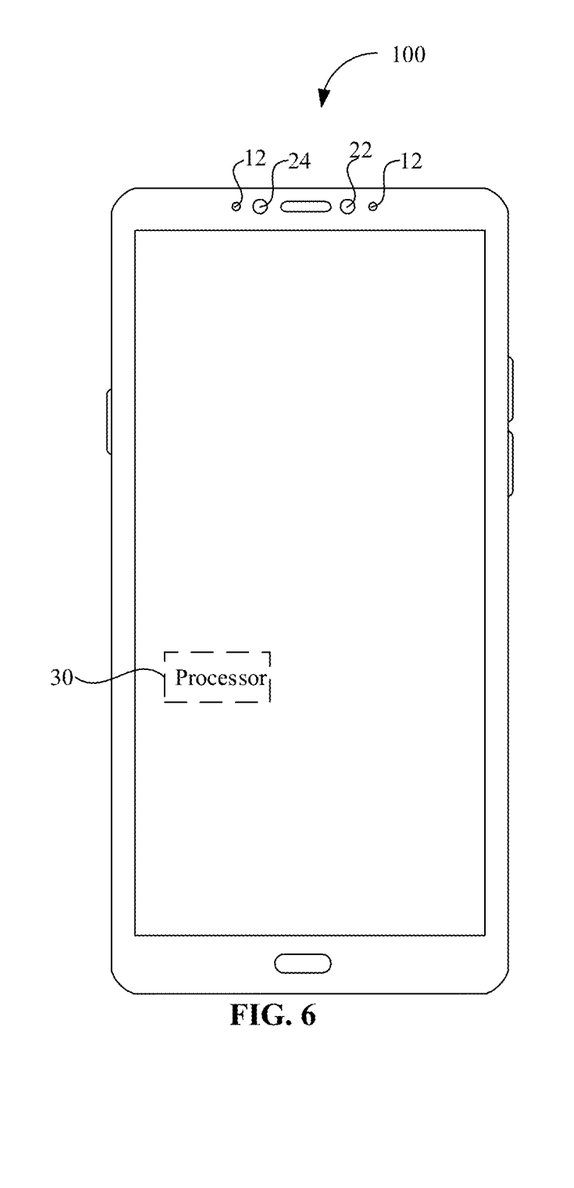
FIG. 6 is still another plan view of an electronic device according to the embodiments of the disclosure.

Referring to FIG. 6, in some embodiments, the camera 20 includes a visible light camera 24. The electronic device 100 includes an iris recognition module 40. The iris recognition module 40 includes the infrared light source assembly 10 and an infrared camera 22.

As such, the visible light camera 24 may be used to acquire the image of the face (i.e., the face image).

In order to realize the diversity of functions of the electronic device 100, the camera 20 of the electronic device 100 may include the visible light camera 24 by which a color image is acquired. Since the technologies related to the visible light camera 24 (such as a control method or an image data processing method) are relatively mature, the visible light camera 24 may be used to quickly obtain the face image.

Figure 7:
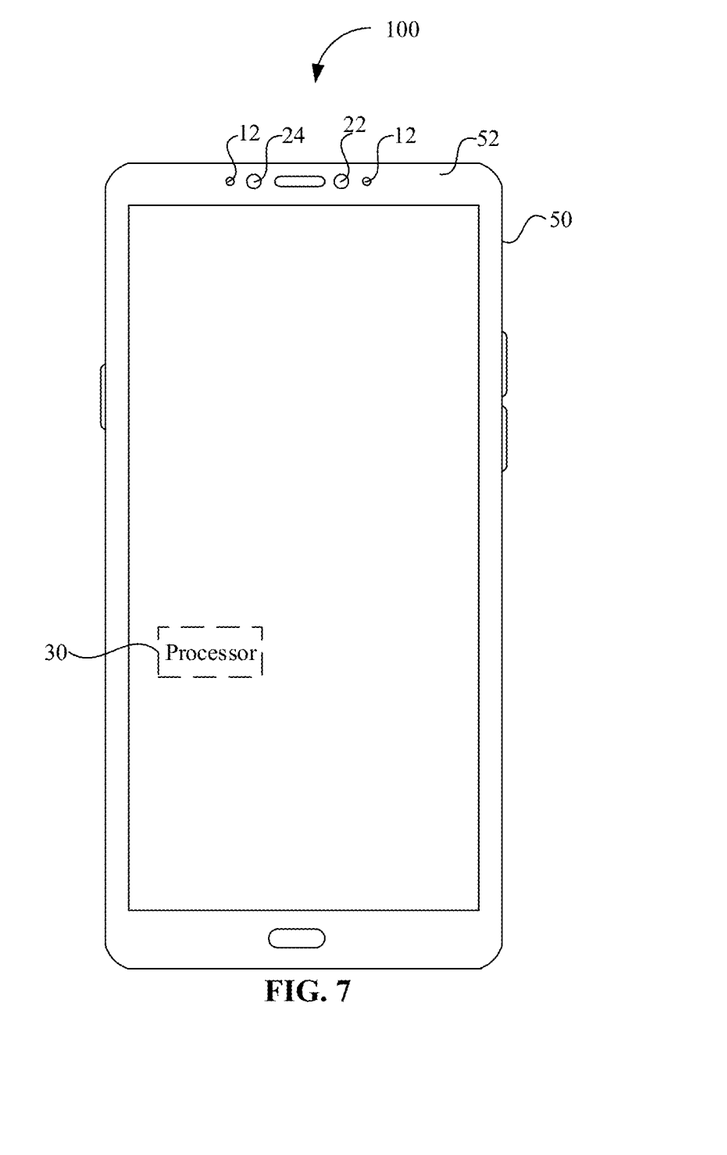
FIG. 7 is yet another plan view of an electronic device according to the embodiments of the disclosure.

Referring to FIG. 7, in some embodiments, the electronic device 100 includes a housing 50. The housing 50 includes a front surface 52. The iris recognition module 40 and the visible light camera 24 are disposed in the housing 50 and exposed from the front surface 52.

As such, the housing 50 of the electronic device 100 may be used to protect the iris recognition module 40 and the visible light camera 24, thereby facilitating the iris recognition module 40 and the visible light camera 24 to operate. The iris recognition module 40 and the visible light camera 24 are disposed in the housing 50, and the iris recognition module 40 and the visible light camera 24 may be protected by the dustproof and waterproof functions of the housing 50, thereby preventing the iris recognition module 40 and the visible light camera 24 from being damaged by external factors and from affecting the normal operation. In addition, the iris recognition module 40 and the visible light camera 24 are exposed from the front surface 52 to facilitate the iris recognition module 40 and the visible light camera 24 to operate, thereby avoiding influence on the light collection of the infrared camera 22 and the visible light camera 24 in the iris recognition module 40 and ensuring that the iris recognition module 40 and the visible light camera 24 can operate efficiently.

Figure 8:
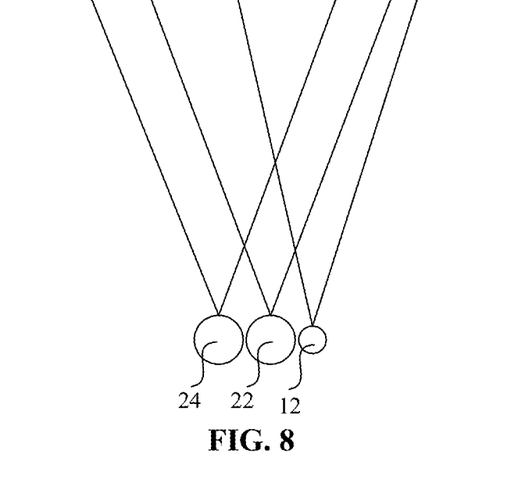
FIG. 8 is a diagram illustrating states of an infrared light source, an infrared camera and a visible light camera according to the embodiments of the disclosure.

Referring to FIG. 8, in some embodiments, an illumination range of an infrared light source 12, a field of view of the infrared camera 22 and a field of view of the visible light camera 24 at least partially overlap.

As such, the infrared light source 12, the infrared camera 22 and the visible light camera 24 may operate cooperatively.

The infrared light source 12 and the infrared camera 22 need to cooperate to realize acquisition of iris images. The infrared light source 12 and the infrared camera 22 may be disposed on the same side of the electronic device 100, and the infrared light source 12 and the infrared camera 22 are adjacently disposed. Therefore, infrared light emitted by the infrared light source 12 can be acquired by the infrared camera 22 after passing through the surface of an object. In addition, the illumination range of the infrared light source 12, the field of view of the infrared camera 22 and the field of view of the visible light camera 24 at least partially overlap, so that the electronic device 100 can acquire the iris image conveniently. For example, the visible light camera 24 may be used to acquire the face image, thereby turning on, according to the position information of the face in the face image, an infrared light source 12 that has an illumination range into which the face falls, and the infrared camera 22, so as to acquire the iris image.

Figure 9:
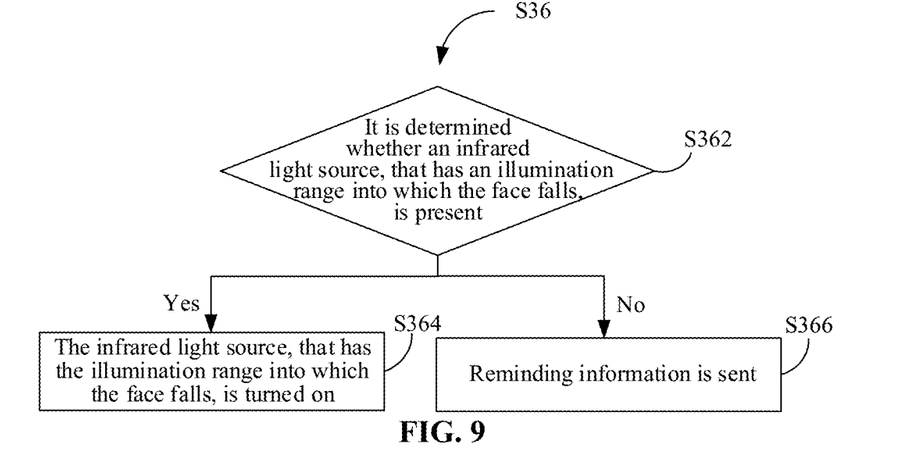
FIG. 9 is yet another flowchart of a control method for an infrared light source assembly according to the embodiments of the disclosure.

Referring to FIG. 9, in some embodiments, S36 includes the following operations.

At S362, it is determined whether the infrared light source 12, that has the illumination range into which the face falls, is present.

At S364, when the infrared light source 12, that has the illumination range into which the face falls, is present, the infrared light source 12, that has the illumination range into which the face falls, is turned on.

At S366, when the infrared light source 12, that has the illumination range into which the face falls, is absent, reminding information is sent.

Referring to FIG. 2 again, in some embodiments, the processor 30 is configured to: determine whether the infrared light source 12, that has the illumination range into which the face falls, is present; and when the infrared light source 12, that has the illumination range into which the face falls, is present, turn on the infrared light source 12 that has the illumination range into which the face falls; when the infrared light source 12, that has the illumination range into which the face falls, is absent, send reminding information.

That is, the operations S362, S364 and S366 may be implemented by the processor 30.

As such, if there is no infrared light source 12 that has an illumination range into which the face falls, a user may be reminded.

After obtaining the position information of the face in the image of the face, it may be determined whether there is an infrared light source 12 that has an illumination range into which the face falls. If there is the infrared light source 12 that has the illumination range into which the face falls, the infrared light source 12 that has the illumination range into which the face falls is turned on, thereby providing infrared light to the face (especially the eye) by the infrared light source 12 that has the illumination range into which the face falls, so as to facilitate the infrared camera 22 to acquire the iris image. If there is no infrared light source 12 that has an illumination range into which the face falls, for example, when the infrared light sources 12 are all located at an upper portion of the electronic device 100 and the face position information includes a lower portion, or the distance of the face from the electronic device 100 is too far, the electronic device 100 may be controlled to send reminding information to remind the user that the success rate of acquiring the iris image at this time is not high or the iris image cannot be acquired, so that the user may adjust the face position to facilitate the electronic device 100 to acquire the iris image.

Figure 10:
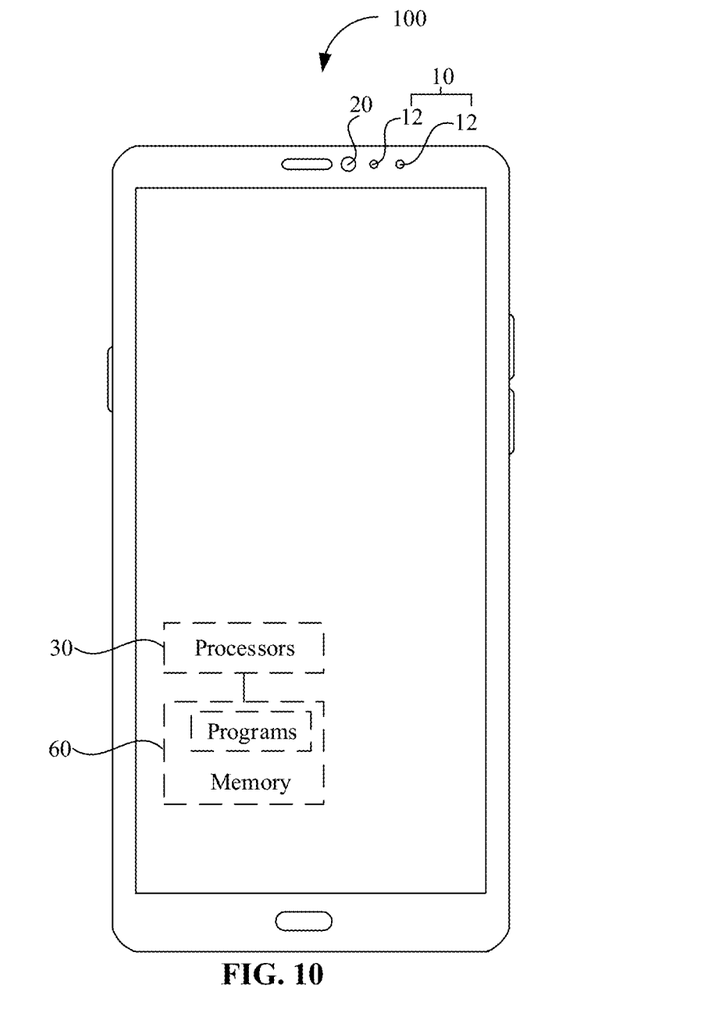
FIG. 10 is still yet another plan view of an electronic device according to the embodiments of the disclosure.

Referring to FIG. 10, an electronic device 100 according to the embodiments of the disclosure includes an infrared light source assembly 10, a camera 20, one or more processors 30, a memory 60, and one or more programs. The one or more programs are stored in the memory 60, and configured to be executed by the one or more processors 30 to perform instructions for the control method according to any one embodiment of the disclosure.

As an example, the programs may be configured to perform instructions for the following control method.

At S32, the camera 20 is controlled to acquire an image of a face.

At S34, the image of the face is processed to obtain position information of the face.

At S36, according to the position information of the face, an infrared light source 12, that has an illumination range into which the face falls, is turned on, and other infrared light sources 12 are turned off or remain turned off.

Figure 11:
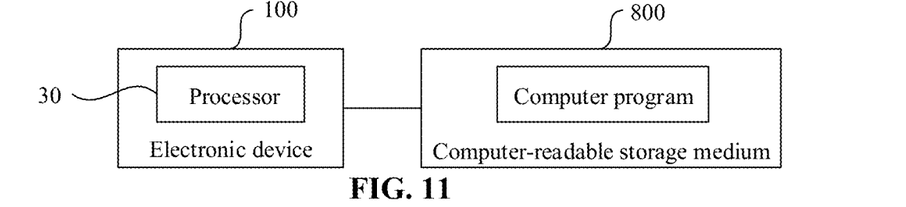
FIG. 11 is a diagram illustrating a connection of an electronic device and a computer-readable storage medium according to the embodiments of the disclosure.

Referring to FIG. 11, a computer-readable storage medium 800 according to the embodiments of the disclosure includes a computer program for use in conjunction with an electronic device 100. The computer program may be executed by a processor 30 to complete the control method according to any one embodiment of the disclosure.

As an example, the computer program may be executed by the processor 30 to complete the following control method.

At S32, the camera 20 is controlled to acquire an image of a face.

At S34, the image of the face is processed to obtain position information of the face.

At S36, according to the position information of the face, an infrared light source 12, that has an illumination range into which a face falls, is turned on, and other infrared light sources 12 are turned off or remain turned off.

The computer-readable storage medium 800 may be a storage medium built in the electronic device 100 or a storage medium that is pluggably inserted into the electronic device 100.

In the descriptions of the embodiments of the disclosure, terms "first" and "second" are only adopted for description and should not be understood to indicate or imply relative importance or implicitly indicate the number of indicated technical features. Therefore, features defined by "first" and "second" may explicitly or implicitly indicate inclusion of one or more of such features. In the descriptions of the embodiments of the disclosure, "multiple" means two or more unless otherwise limited definitely and specifically.

In the descriptions of the embodiments of the disclosure, unless otherwise specified and limited, terms "mounting", "mutual connection" and "connection" should be generally understood. For example, it may be fixed connection or detachable connection or integral connection, may be mechanical connection, electrical connection or mutual communication, a may be direct connection or indirect connection through an intermediate, or may be communication inside two elements or interaction between two elements. Those of ordinary skill in the art can understand specific implications of the above terms in the embodiments of the disclosure according to specific situations.

In the description of the present specification, the description with reference to the terms "one embodiment", "some embodiments", "illustrative embodiment", "example", "specific example", or "some examples", etc. means that specific features, structures, materials or characteristics described in conjunction with embodiments or examples are included in at least one embodiment or example of the disclosure. In the present specification, the schematic representation of the above terms does not necessarily mean the same embodiment or example. Furthermore, the specific features, structures, materials, or characteristics described may be combined in a suitable manner in any one or more embodiments or examples.

Any process or method in the flowcharts or described herein in another manner may be understood to represent a module, segment or part including codes of one or more executable instructions configured to realize specific logic functions or operations of the process and, moreover, the scope of the preferred embodiment of the disclosure includes other implementation, not in a sequence illustrated or discussed herein, including execution of the functions basically simultaneously or in an opposite sequence according to the involved functions. This should be understood by those skilled in the art of the embodiments of the disclosure.

Logics and/or operations represented in the flowcharts or described herein in another manner, for example, may be considered as a fixed sequence list of executable instructions configured to realize the logic functions and may implemented in any computer-readable medium for an instruction execution system, device or equipment (for example, a computer-based system, a system including a processing module or other systems capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), a Random Access Memory (RAM), a Read-Only Memory (ROM), an Erasable Programmable ROM (EPROM) or flash memory, an optical fiber device and a portable Compact Disc Read-Only Memory (CD-ROM). In addition, the computer-readable medium may even be paper or other mediums on which the program may be printed because, for example, the paper or other mediums may be optically scanned then edited, interpreted or, when necessary, processed in another proper manner to obtain the program in an electronic manner for storage in the computer memory.

Each part of the embodiments of the disclosure may be implemented by hardware, software, firmware or a combination thereof. In the above embodiments, multiple operations or methods may be implemented by software or firmware stored in a memory and executed by a proper instruction execution system. For example, in case of implementation with the hardware, like another embodiment, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Array (FPGA) and the like.

Those of ordinary skill in the art should understand that all or part of the operations in the methods of the abovementioned embodiments may be completed through related hardware instructed by a program, the program may be stored in a computer-readable storage medium, and when the program is executed, one or combination of the operations of the method embodiments is included.

In addition, each functional unit in each embodiment of the disclosure may be integrated into a processing module, or each unit may physically exist independently, or two or more than two units may be integrated into a module. The integrated module may be implemented in a hardware form or may also be implemented in form of software functional module. When being implemented in form of software functional module and sold or used as an independent product, the integrated module may be stored in a computer-readable storage medium.

The abovementioned storage medium may be a ROM, a magnetic disk, an optical disk or the like.

The embodiments of the disclosure have been illustrated or described above. However, it can be understood that the above embodiments are exemplary and should not be understood as limits to the disclosure and those of ordinary skill in the art may make variations, modifications, replacements, transformations to the above embodiments within the scope of the disclosure.

What is claimed is:

1. A control method for an infrared light source assembly, used in an electronic device, wherein the electronic device comprises a camera, the infrared light source assembly comprises at least two infrared light sources having different illumination ranges, and the control method comprises:
   controlling the camera to acquire an image of a face;
   processing the image of the face to obtain position information of the face; and
   determining, according to the position information of the face, whether an infrared light source, that has an illumination range into which the face falls, is present; and
   when the infrared light source, that has the illumination range into which the face falls, is present turning on the infrared light source that has the illumination range into which the face falls, and turning off other infrared light sources;
   when the infrared light source, that has the illumination range into which the face falls, is absent, sending reminding information.

2. The control method according to claim 1, wherein the electronic device comprises a mobile phone, a notebook computer, a tablet computer, a smart watch, or smart glasses.

3. The control method according to claim 1, wherein the camera comprises an infrared camera, the electronic device comprises an iris recognition module, and the iris recognition module comprises the infrared light source assembly and the infrared camera.

4. The control method according to claim 3, wherein controlling the camera to acquire the image of the face comprises:
   turning off or keeping turning off the at least two infrared light sources; and
   controlling the infrared camera to acquire the image of the face.

5. The control method according to claim 3, wherein controlling the camera to acquire the image of the face comprises:
   turning on at least one of the at least two infrared light sources, and turning off or keeping turning off other infrared light sources except the at least one infrared light source; and
   controlling the infrared camera to acquire the image of the face.

6. The control method according to claim 1, wherein the camera comprises a visible light camera, the electronic device comprises an iris recognition module, and the iris recognition module comprises the infrared light source assembly and an infrared camera.

7. The control method according to claim 6, wherein the electronic device comprises a housing, the housing comprises a front surface, and the iris recognition module and the visible light camera are disposed in the housing and exposed from the front surface.

8. The control method according to claim 6, wherein an illumination range of an infrared light source, a field of view of the infrared camera and a field of view of the visible light camera at least partially overlap.

9. An electronic device, comprising:
   an infrared light source assembly, comprising at least two infrared light sources having different illumination ranges;
   a camera;
   one or more processors;
   a memory; and
   one or more programs, which are stored in the memory and are configured to be executed by the one or more processors to perform the control method according to claim 1.

10. A non-transitory computer-readable storage medium having a computer program for use in conjunction with an electronic device, wherein the computer program is executed by a processor to perform the control method according to claim 1.

11. An electronic device, comprising: an infrared light source assembly, comprising at least two infrared light sources having different illumination ranges; a camera, configured to acquire an image of a face; and a processor, configured to: determine, according to position information of the face in the image of the face that is acquired by the camera, whether an infrared light source, that has an illumination range into which the face falls, is present; and when the infrared light source, that has the illumination range into which the face falls, is present, turn on the infrared light source that has the illumination range into which the face falls, and turn in off other infrared light sources; when the infrared light source, that has the illumination range into which the face falls, is absent, send reminding information.

12. The electronic device according to claim 11, wherein the electronic device comprises a mobile phone, a notebook computer, a tablet computer, a smart watch, or smart glasses.

13. The electronic device according to claim 11, wherein the camera comprises an infrared camera, the electronic device comprises an iris recognition module, and the iris recognition module comprises the infrared light source assembly and the infrared camera.

14. The electronic device according to claim 13, wherein the processor is configured to:
- turn off or keep turning off the at least two the infrared light sources; and
- control the infrared camera to acquire the image of the face.

15. The electronic device according to claim 13, wherein the processor is configured to:
- turn on at least one of the at least two infrared light sources, and turn off or keep turning off other infrared light sources except the at least one infrared light source; and
- control the infrared camera to acquire the image of the face.

16. The electronic device according to claim 11, wherein the camera comprises a visible light camera, the electronic device comprises an iris recognition module, and the iris recognition module comprises the infrared light source assembly and an infrared camera.

17. The electronic device according to claim 16, wherein the electronic device comprises a housing, the housing comprises a front surface, and the iris recognition module and the visible light camera are disposed in the housing and exposed from the front surface.

18. The electronic device according to claim 16, wherein an illumination range of an infrared light source, a field of view of the infrared camera and a field of view of the visible light camera at least partially overlap.

\* \* \* \* \*